UNITED STATES PATENT OFFICE.

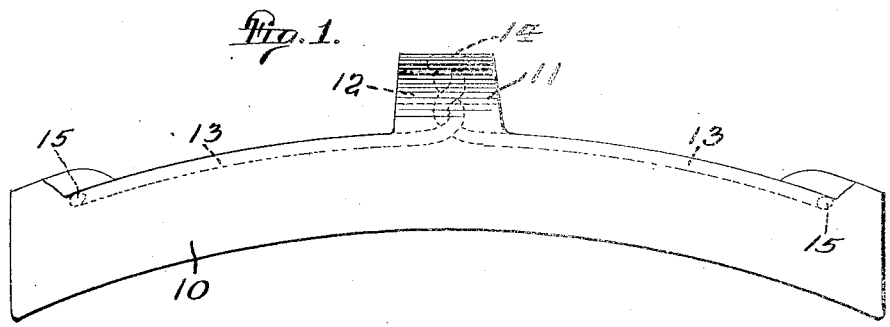
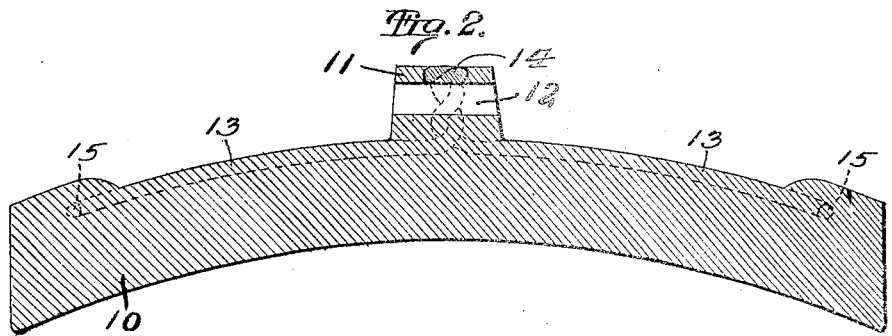
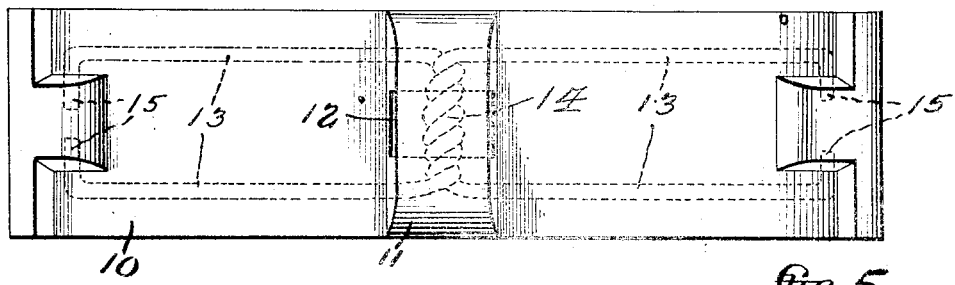
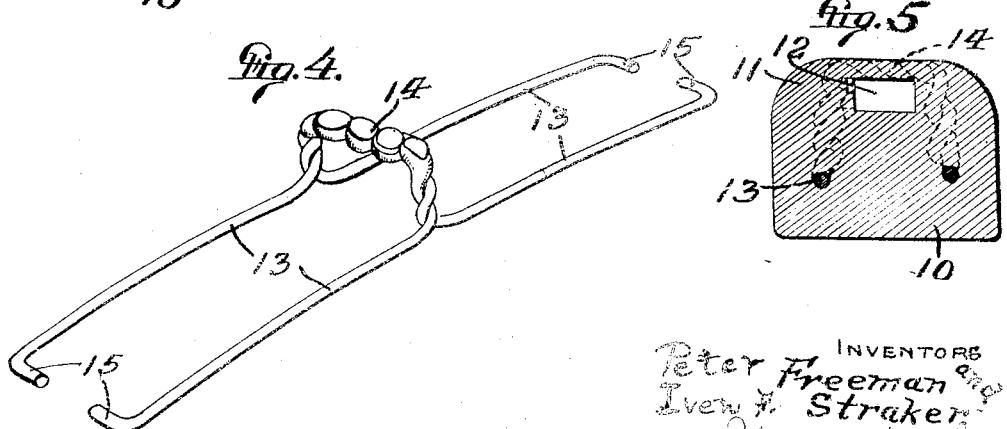
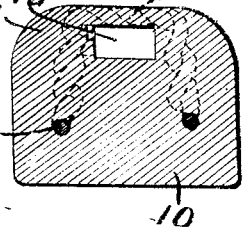

PETER FREEMAN AND IVEN F. STRAKER, OF CHATTANOOGA, TENNESSEE.

REENFORCEMENT FOR BRAKE SHOES.

1,403,855. Specification of Letters Patent. Patented Jan. 17, 1922.

Application filed December 18, 1919. Serial No. 344,643.

*To all whom it may concern:*

Be it known that we, PETER FREEMAN and IVEN F. STRAKER, citizens of the United States, residing at Chattanooga, in the county of Hamilton and State of Tennessee, have invented certain new and useful Improvements in Reenforcement for Brake Shoes; and we do hereby declare the following to be a full, clear, and exact description of the invention, such as will enable others skilled in the art to which it appertains to make and use the same.

The present invention relates to brake shoes, and has particular reference to a novel reenforcement for strengthening the same.

The object of the present invention is to provide a reenforcement adapted to strengthen the body part of the shoe and to also strengthen the attaching lug by means of which the shoe is secured to the brake head, the reenforcement not only strengthening this lug but serving as a lug itself should the usual lug become broken or worn.

Another object is to provide a reenforcement which embodies simplicity in construction and economy in material, the reenforcement being made of but two lengths of wire which are peculiarly interconnected and formed to provide the double reenforcement for the back of the shoe and the lug of the shoe.

With these and further objects in view as will in part hereinafter become apparent and in part be stated, the invention comprises certain novel constructions, combinations and arrangements of parts as subsequently specified and claimed.

In the accompanying drawing,—

Figure 1 is a side elevation of a brake shoe reenforced according to the present invention.

Figure 2 is a longitudinal section taken centrally through the same.

Figure 3 is a rear face elevation of the reenforced brake shoe.

Figure 4 is a detail, perspective view of the improved reenforcement prior to being embedded in the brake shoe.

Figure 5 is a transverse section taken midway between the ends of the brake shoe showing the attaching lug and the reenforcement embedded therein.

Referring to the drawing by numerals, 10 designates the body of a brake shoe which is of ordinary construction and made preferably of cast metal of arcuate form to embrace the periphery of a wheel and having the usual attaching lug 11 for receiving the locking pin which holds the brake shoe to the brake head. The lug 11 is provided with a transverse opening 12 through which the locking key is secured, and the lug projects from the rear face of the shoe and extends substantially across the entire width of the shoe.

The reenforcement of this invention comprises two strands of wire of equal length which are first twisted together intermediate their ends to provide a part which is of double thickness. From the double thick part the ends of the wire strands are bent in opposite directions to form arms 13 at each end of the double thick part, and the said double thick part is arched upwardly from the meeting ends of the arms 13 to form a lug loop 14. The free ends of the arms 13 are bent inwardly toward each other to form anchoring fingers 15 which may be used and are adapted to seat in the opposite ends of the brake shoe body 10 to anchor the reenforcement in the body.

The loop 14 is formed of sufficient width and height to project upwardly in the lug 11 at opposite sides and across the top of the pin receiving opening 12. The loop 14, therefore, forms an encircling reenforcement for that part of the brake shoe through which the retaining pin passes for reenforcing the brake shoe and holding the same to the brake head should, for any reason, the lug 11 become broken or distorted. The loop 14 is held to the body of the brake shoe 10 by the relatively long arms 13 which extend longitudinally in the back of the brake shoe 10 and near the opposite edges of the same. The loop 14 is thus firmly mounted in the body of the brake shoe and should the lug 11 become cracked or broken, the rigidity of the reenforcement is not impaired, but, on the other hand, the fragments of the lug 11 are maintained in proper relation and held from separation by the double thick reenforcing loop 14.

As the thickness of the lug 14 is not as great above the key opening 12, the intermediate or bridge portion of the loop 14 is preferably flattened, as shown to advantage in Figures 2 and 4, to provide a flat bar which extends in the lug 11 across the top of the opening 12. This flattening of the upper and lower sides of the loop 14 brings the wire strands into intimate contact at those portions which are twisted about each other, so that the reenforcement as a whole is formed into substantially an integral mass and may be held in the mold as one piece.

In the manufacture of the brake shoes the usual process is carried out wherein the molten metal is poured into the mold about the reenforcement, the latter being held in any suitable manner in proper position in the mold, so that the molten material will readily flow into the interstices in the loop 14 by reason of the twisting together of the strands and may freely cover and collect about all sides and corners of the two wires. The two wires which form the reenforcement are thus practically embedded in the brake shoe body and lug and constitute a part thereof.

It will be observed that each wire strand has an arm 13 in one end of the brake shoe 10, that said arm extends through the twisted loop 14 and emerges at the other side of the brake shoe in an arm 13 which extends longitudinally in the brake shoe and toward the opposite end thereof. In this manner each end of the reenforcement is braced upon the other end so that the pair of arms 13 at one end of the reenforcement cannot swing or hinge upon the other pair of arms. This not only increases the strength and resistance of the reenforcement when in use, but also enables the correct holding of the reenforcement with its arms 13 in proper relation during the molding process.

What is claimed is:—

1. A reenforcement for brake shoes comprising wire strands adapted to be embedded in the body of a brake shoe and having intertwisted portions looped upwardly through the lug of the brake shoe for reenforcing the same.

2. A reenforcement for brake shoes comprising wire strands embedded longitudinally in the back of the brake shoe and having portions extending upwardly and twisted together in the lug of the brake shoe.

3. A reenforcement for brake shoes comprising wire strands embedded longitudinally in the back of the brake shoe and having intertwisted portions forming a double thick loop of a height and width adapted to extend upwardly in the lug of the brake shoe at opposite sides and across the top of the key-hole in the lug.

4. A reenforcement for brake shoes comprising a pair of wire strands twisted together intermediate their ends and formed into an upwardly extending loop at the place of the twist, the free end portions of the wire strands being bent in opposite directions to form arms, said arms being adapted to be embedded in the back of a brake shoe with said loop embedded in the lug of the brake shoe.

5. A reenforcement for brake shoes comprising a pair of wire strands twisted together at their intermediate portions and the double thick portion being bent to provide an upwardly extending loop, the free ends of one wire strand extending from the opposite ends of the loop in opposite directions and the wire strands providing oppositely extending arms adapted to be embedded in the back of a brake shoe for supporting the loop in the lug of the brake shoe.

6. A reenforcement for brake shoes comprising a pair of wire strands bent into substantially U-shape with the portions forming the U twisted together, the free end portions of the wire strands diverging in opposite directions to form arms adapted to be embedded in the body of the brake shoe for supporting the twisted portions thereof in the lug of the brake shoe.

7. A reenforcement for brake shoes comprising wire strands adapted to be embedded in the body of a brake shoe and having an intermediate twisted portion looped to be embedded in the lug of the brake shoe and to extend about the aperture of said lug, said twisted portion being flattened to reduce the thickness above said aperture and to increase the bonding with the cast material of the lug.

In testimony whereof we affix our signatures in presence of two witnesses.

PETER FREEMAN.
IVEN F. STRAKER.

Witnesses as to Peter Freeman:
  H. CLAY EVANS,
  C. E. LYNN.

Witnesses as to Iven F. Straker:
  T. H. HINCH,
  S. M. ADAMS.